US011617192B2

(12) United States Patent
Chendamarai Kannan et al.

(10) Patent No.: US 11,617,192 B2
(45) Date of Patent: Mar. 28, 2023

(54) NEIGHBOR CELL TCI SIGNALING FOR INTERFERENCE COORDINATION

(71) Applicant: QUALCOMM Incorporated, San Diego, CA (US)

(72) Inventors: Arumugam Chendamarai Kannan, San Diego, CA (US); Vinay Chande, San Diego, CA (US); Tao Luo, San Diego, CA (US); Xiaoxia Zhang, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 17/035,355

(22) Filed: Sep. 28, 2020

(65) Prior Publication Data

US 2021/0100017 A1 Apr. 1, 2021

Related U.S. Application Data

(60) Provisional application No. 62/908,469, filed on Sep. 30, 2019.

(51) Int. Cl.
*H04W 56/00* (2009.01)
*H04W 72/1273* (2023.01)
(Continued)

(52) U.S. Cl.
CPC ...... *H04W 72/1273* (2013.01); *H04B 7/0456* (2013.01); *H04L 1/0003* (2013.01);
(Continued)

(58) Field of Classification Search
CPC . H04W 72/1273; H04W 76/11; H04W 76/27; H04W 56/001; H04W 72/042;
(Continued)

(56) References Cited

U.S. PATENT DOCUMENTS 6,529,301 B1 3/2003 Wang
2007/0263744 A1* 11/2007 Mostafa ............... H04B 7/0857
375/267

(Continued)

OTHER PUBLICATIONS

Alcatel-Lucent, et al., "Proposals for X2 Signalling Enhancement for eCoMP", 3GPP Draft; 3GPP TSG RAN WG1 Meeting #74bis, R1-134235, Proposals for X2 Signalling Enhancement for eCoMP_ Final, 3rd Generation Partnership Project (3GPP), Mobile Competence Centre; 650, Route Des Lucioles; F-06921, Sophia-Antipolis, vol. RAN WG1, No. Guangzhou, China; Oct. 7, 2013-Oct. 11, 2013,Sep. 28, 2013 (Sep. 28, 2013), XP050717417, pp. 1-4, Retrieved from the Internet: URL: http://www.3gpp.org/ftp/tsg_ran/WG1_ RL1/TSGR1_74b/Docs/, [retrieved on Sep. 28, 2013] p. 3.
(Continued)

*Primary Examiner* — Sai Ming Chan
(74) *Attorney, Agent, or Firm* — Norton Rose Fulbright US LLP

(57) ABSTRACT

In a particular implementation, a method includes receiving, at a first base station from a second base station via a backhaul communication, a scheduling message indicating one or more beams of the second base station that are scheduled for use in upcoming transmissions. The second base station is a neighboring base station of the first base station. The method further includes transmitting, from the first base station to a user equipment (UE), the scheduling message.

29 Claims, 9 Drawing Sheets

(51) Int. Cl.
*H04W 72/044* (2023.01)
*H04W 88/14* (2009.01)
*H04W 76/27* (2018.01)
*H04W 72/04* (2023.01)
*H04W 72/0446* (2023.01)
*H04W 72/08* (2009.01)
*H04L 1/00* (2006.01)
*H04B 7/0456* (2017.01)
*H04L 5/00* (2006.01)
*H04W 76/11* (2018.01)

(52) U.S. Cl.
CPC ......... *H04L 5/0055* (2013.01); *H04W 56/001* (2013.01); *H04W 72/042* (2013.01); *H04W 72/046* (2013.01); *H04W 72/0446* (2013.01); *H04W 72/082* (2013.01); *H04W 76/11* (2018.02); *H04W 76/27* (2018.02); *H04W 88/14* (2013.01)

(58) Field of Classification Search
CPC ........... H04W 72/0446; H04W 72/046; H04W 72/082; H04W 88/14; H04B 7/0456; H04L 1/0003; H04L 5/0055
USPC .......................................................... 370/329
See application file for complete search history.

(56) References Cited

U.S. PATENT DOCUMENTS

| | | | | |
|---|---|---|---|---|
| 2008/0003950 | A1* | 1/2008 | Haapoja | H02M 1/44 455/73 |
| 2010/0039948 | A1* | 2/2010 | Agrawal | H04W 72/082 370/252 |
| 2010/0124205 | A1* | 5/2010 | Ghanadan | H04W 72/1278 370/336 |
| 2013/0053078 | A1 | 2/2013 | Barbieri et al. | |
| 2013/0188624 | A1* | 7/2013 | Lee | H04W 24/02 370/338 |
| 2013/0258868 | A1* | 10/2013 | Davis | H04L 5/0044 370/252 |
| 2014/0098793 | A1* | 4/2014 | Hunukumbure | H04L 25/03891 370/332 |
| 2015/0195757 | A1* | 7/2015 | Tietz | H04B 7/155 455/438 |
| 2017/0033916 | A1* | 2/2017 | Stirling-Gallacher | H04L 5/14 |
| 2018/0167848 | A1* | 6/2018 | Lei | H04W 72/0453 |
| 2019/0190635 | A1* | 6/2019 | Goel | H04J 3/0644 |
| 2019/0215097 | A1* | 7/2019 | Wang | H04L 5/0055 |
| 2020/0351801 | A1* | 11/2020 | Jeon | H04W 52/48 |
| 2021/0050666 | A1* | 2/2021 | Cirik | H01Q 3/24 |
| 2021/0105783 | A1* | 4/2021 | Wang | H04W 72/0453 |
| 2021/0127389 | A1* | 4/2021 | Liu | H04L 5/0087 |
| 2021/0263744 | A1* | 8/2021 | Crupnicoff | G06F 9/3836 |
| 2021/0385864 | A1* | 12/2021 | Wu | H04L 5/0053 |

OTHER PUBLICATIONS

Ericsson: "On Beam Indication, Measurement, and Reporting", 3GPP Draft, 3GPP TSG-RAN WG1 NR Ad Hoc #3, R1-1716350 On Beam Indication, Measurement, and Reporting, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017, XP051339805, 13 Pages, Retrieved from the Internet: URL:http://www.3gpp.org/ftp/Meetings_3GPP_SYNC/RAN1/Docs/ [retrieved on Sep. 17, 2017], section 3.

International Search Report and Written Opinion—PCT/US2020/053245—ISA/EPO—dated Dec. 10, 2020.

LG Electronics: "Consideration of X2 Backhaul for CoMP", 3GPP Draft; 3GPP TSG RAN WG1 Meeting #66, R1-112340 Consideration of X2 Backhaul for CoMP R1, 3rd Generation Partnership Project (3GPP), Mobile Competence Centre; 650, Route Des Lucioles; F-06921 Sophia-Antipolis Cedex; France, vol. RAN WG1, No. Athens, Greece; Aug. 22, 2011, Aug. 16, 2011 (Aug. 16, 2011), XP050537476, pp. 1-5, [retrieved on Aug. 16, 2011], p. 2.

Nokia, et al., "High-Level Principles for Beam Coordination and Link Adaptation in NR", 3GPP Draft; 3GPP TSG-RAN WG1 #86-BIS, R1-1610254, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Sep. 30, 2016 (Sep. 30, 2016), XP051158894, 3 Pages, Retrieved from the Internet: URL: http://www.3gpp.org/ftp/tsg_ran/WG1_RL1/TSGR1_86b/Docs/, [retrieved on Sep. 30, 2016], p. 1, paragraph section 2-p. 3, figure 2.

ZTE: "Overview of Duplexing and Interference Management", 3GPP Draft; 3GPP TSG RAN WG1 Meeting#89, R1-1707203—7. 1.6 Overview of Duplexing and Interference MANGT, 3rd Generation Partnership Project (3GPP), Mobile Competence Centre; 650, Route Des Lucioles; F-06921 Sophia-Antipolis Cedex; F, vol. RAN WG1, No. Hangzhou; May 15, 2017-May 19, 2017, May 14, 2017 (May 14, 2017), XP051272418, pp. 1-10, Retrieved from the Internet: URL: http://www.3gpp.org/ftp/Meetings_3GPP_SYNC/RAN1/Docs/, [retrieved on May 14, 2017], p. 7, paragraph section 3.2.1, p. 8, paragraph section 3.2.3, p. 9, paragraph section 3.2.5.

* cited by examiner

NEIGHBOR CELL TCI SIGNALING FOR INTERFERENCE COORDINATION

CROSS-REFERENCE TO RELATED APPLICATIONS

This application claims the benefit of U.S. Provisional Patent Application No. 62/908,469, entitled, "NEIGHBOR CELL TCI SIGNALING FOR INTERFERENCE COORDINATION," filed on Sep. 30, 2019, which is expressly incorporated by reference herein in its entirety.

TECHNICAL FIELD

Aspects of the present disclosure relate generally to wireless communication systems, and more particularly, to neighbor cell transmission configuration indication (TCI) signaling for interference coordination.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME ASPECTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, at a first base station from a second base station via a backhaul communication, a scheduling message indicating one or more beams of the second base station that are scheduled for use in upcoming transmissions. The second base station is a neighboring base station of the first base station. The method further includes transmitting, from the first base station to a user equipment (UE), the scheduling message.

In an additional aspect of the disclosure, an apparatus configured for wireless communication is disclosed. The apparatus includes at least one processor, and a memory coupled to the at least one processor. The at least one processor is configured to receive, at a first base station from a second base station via a backhaul communication, a scheduling message indicating one or more beams of the second base station that are scheduled for use in upcoming transmissions. The second base station is a neighboring base station of the first base station. The at least one processor is further configured to initiate transmission, from the first base station to a user equipment (UE), of the scheduling message.

In an additional aspect of the disclosure, an apparatus configured for wireless communication is disclosed. The apparatus includes means for receiving, at a first base station from a second base station via a backhaul communication, a scheduling message indicating one or more beams of the second base station that are scheduled for use in upcoming transmissions. The second base station is a neighboring base station of the first base station. The apparatus further includes means for transmitting, from the first base station to a user equipment (UE), the scheduling message.

In an additional aspect of the disclosure, a non-transitory computer-readable medium stores instructions that, when executed by a processor, cause the processor to perform operations including receiving, at a first base station from a second base station via a backhaul communication, a scheduling message indicating one or more beams of the second base station that are scheduled for use in upcoming transmissions. The second base station is a neighboring base station of the first base station. The operations further include initiating transmission, from the first base station to a user equipment (UE), of the scheduling message.

In an additional aspect of the disclosure, a method of wireless communication includes receiving, from a first base station at a user equipment (UE), a scheduling message indicating one or more beams of a second base station that are scheduled for use in upcoming transmissions. The second base station is a neighboring base station of the first base station. The method further includes performing, at the UE, one or more operations based on the scheduling message.

In an additional aspect of the disclosure, an apparatus configured for wireless communication is disclosed. The apparatus includes at least one processor, and a memory coupled to the at least one processor. The at least one processor is configured to receive, from a first base station at a user equipment (UE), a scheduling message indicating one or more beams of a second base station that are scheduled for use in upcoming transmissions. The second base station is a neighboring base station of the first base station. The at least one processor is further configured to perform, at the UE, one or more operations based on the scheduling message.

In an additional aspect of the disclosure, an apparatus configured for wireless communication is disclosed. The apparatus includes means for receiving, from a first base station at a user equipment (UE), a scheduling message indicating one or more beams of a second base station that are scheduled for use in upcoming transmissions. The second base station is a neighboring base station of the first base station. The apparatus further includes means for performing, at the UE, one or more operations based on the scheduling message.

In an additional aspect of the disclosure, a non-transitory computer-readable medium stores instructions that, when executed by a processor, cause the processor to perform operations including receiving, from a first base station at a user equipment (UE), a scheduling message indicating one or more beams of a second base station that are scheduled for use in upcoming transmissions. The second base station is a neighboring base station of the first base station. The operations further include performing, at the UE, one or more operations based on the scheduling message.

In an additional aspect of the disclosure, a method of wireless communication includes generating, at a second base station that is a neighboring base station of a first base station, a scheduling message indicating one or more beams of the second base station that are scheduled for use in upcoming transmissions. The method further includes transmitting, from the second base station to the first base station via a backhaul communication, the scheduling message.

In an additional aspect of the disclosure, an apparatus configured for wireless communication is disclosed. The apparatus includes at least one processor, and a memory coupled to the at least one processor. The at least one processor is configured to generate, at a second base station that is a neighboring base station of a first base station, a scheduling message indicating one or more beams of the second base station that are scheduled for use in upcoming transmissions. The at least one processor is further configured to initiate transmission, from the second base station to the first base station via a backhaul communication, of the scheduling message.

In an additional aspect of the disclosure, an apparatus configured for wireless communication is disclosed. The apparatus includes means for generating, at a second base station that is a neighboring base station of a first base station, a scheduling message indicating one or more beams of the second base station that are scheduled for use in upcoming transmissions. The apparatus further includes means for transmitting, from the second base station to the first base station via a backhaul communication, the scheduling message.

In an additional aspect of the disclosure, a non-transitory computer-readable medium stores instructions that, when executed by a processor, cause the processor to perform operations including generating, at a second base station that is a neighboring base station of a first base station, a scheduling message indicating one or more beams of the second base station that are scheduled for use in upcoming transmissions. The operations further include initiating transmission, from the second base station to the first base station via a backhaul communication, of the scheduling message.

Other aspects, features, and implementations of the present disclosure will become apparent to those of ordinary skill in the art, upon reviewing the following description of specific, exemplary aspects of the present disclosure in conjunction with the accompanying figures. While features of the present disclosure may be discussed relative to certain aspects and figures below, various aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method implementations, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
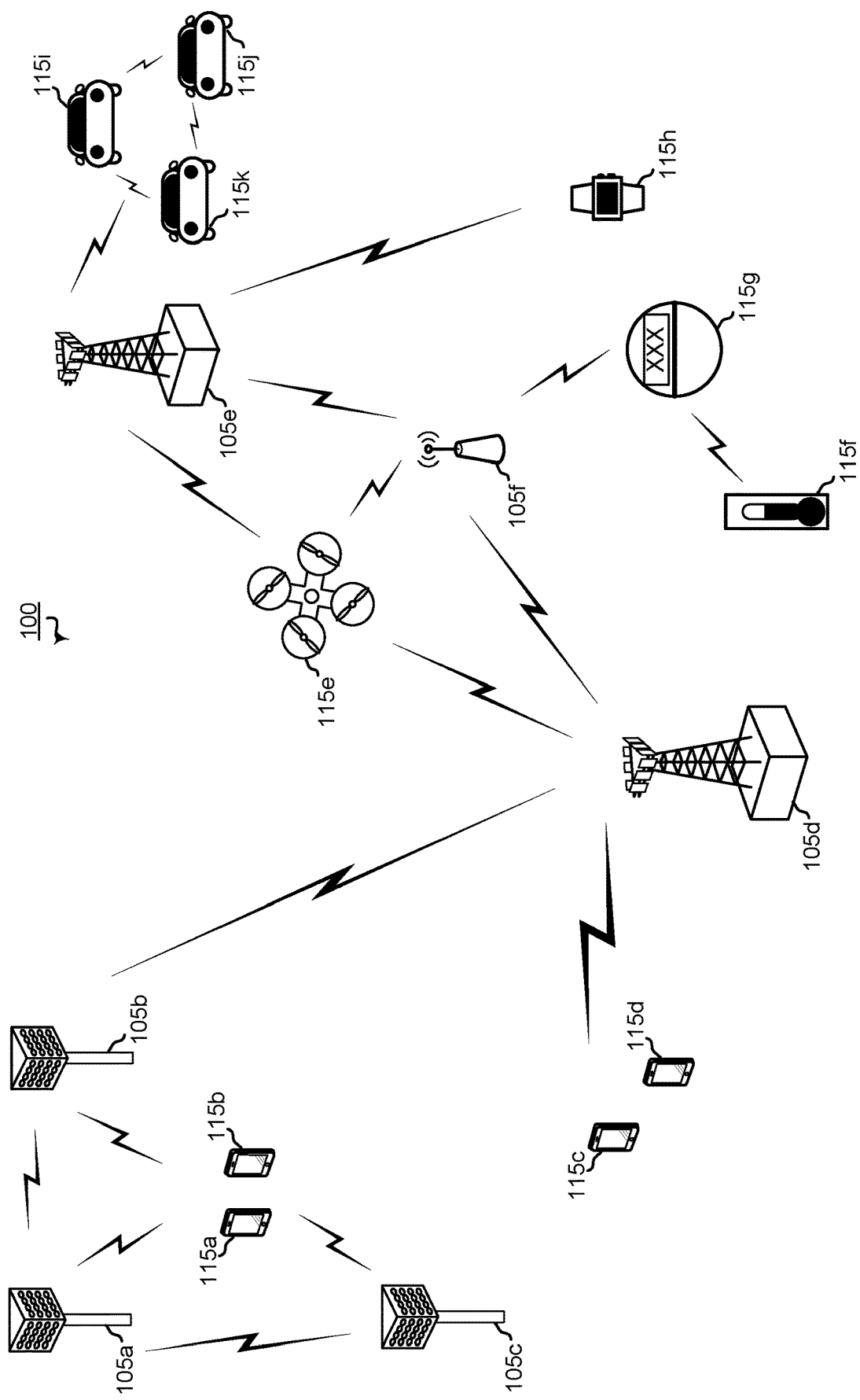
FIG. 1 is a block diagram illustrating details of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The electromagnetic spectrum is often subdivided, based on frequency (or wavelength), into various classes, bands or channels. In fifth generation (5G) new radio (NR), two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band/spectrum in documents and articles, despite being different than the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

This disclosure relates generally to providing or participating in communication as between two or more wireless devices in one or more wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some aspects. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise aspects of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105*a*-105*c* serve UEs 115*a* and 115*b* using 3D beamforming and coordinated spatial techniques, such as coordinated multi-point (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 may support mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
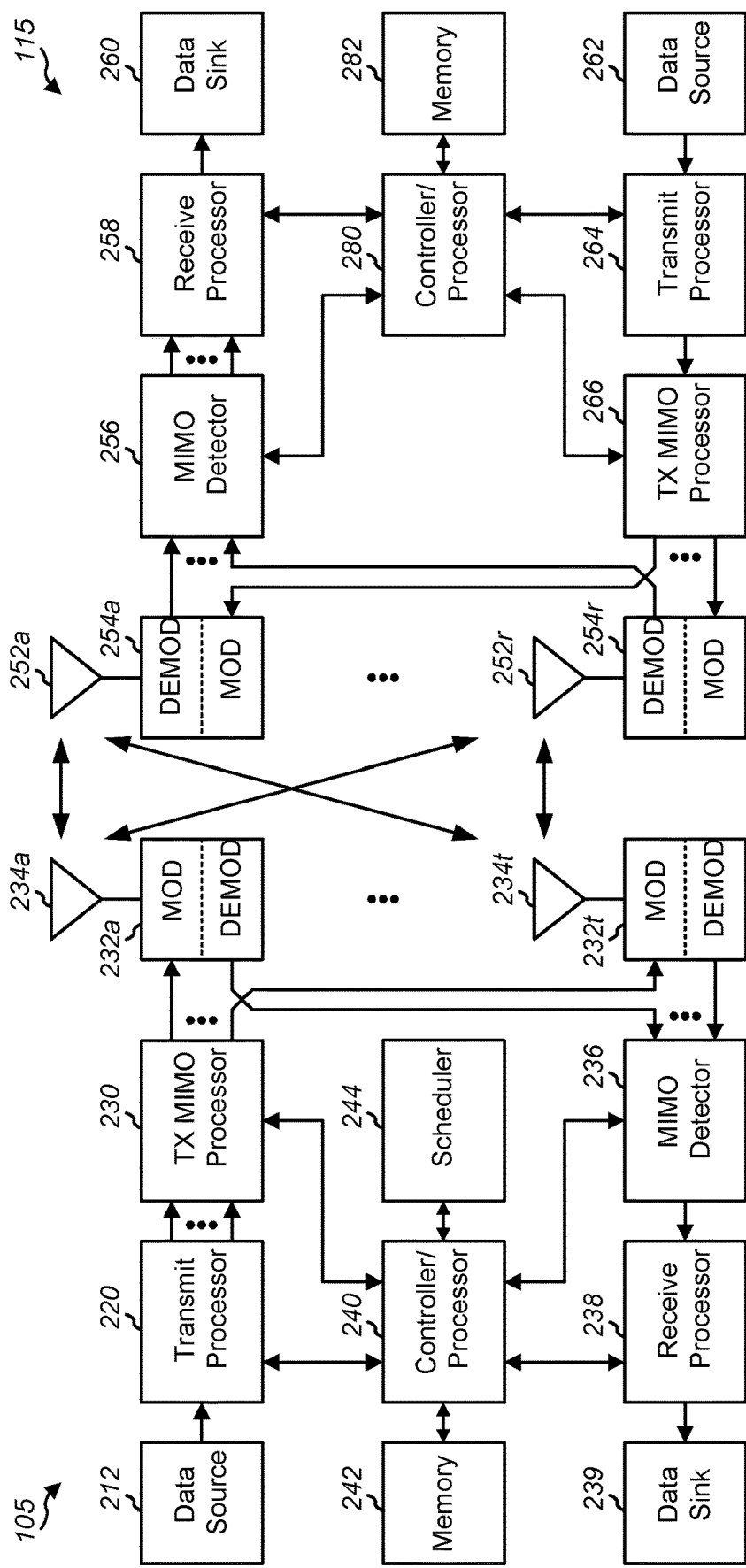
FIG. 2 is a block diagram conceptually illustrating a design of a base station and a UE configured according to some aspects of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105*f* in FIG. 1, and UE 115 may be UE 115*c* or 115D operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232*a* through 232*t*. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 5-7, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In communication systems with beamformed operation (e.g., a system where devices communicate via multiple beams), such as, but not limited to, millimeter wave (mm-Wave) systems, interference observed by a receiver may depend on multiple factors. For example, interference observed by a receiver depends on the beam direction on which the receiver is listening, and the beam direction from which the interference comes from. For this reason, depending on scheduling decisions of a serving cell and neighboring cells, the interference seen by a UE can vary significantly. For example, if a neighboring cell (e.g., a neighboring base station) transmits on a beam in the same direction of the UE, the UE may experience significant interference when receiving a signal from a serving cell (e.g., a serving base station). Alternatively, if the neighboring cell transmits on a beam that is directed away from the UE, the UE may experience little to no interference when receiving a signal from the serving cell.

Time-varying, beam-dependent interference can cause problems in a wireless communication system. For example, a UE channel quality indicator (CQI) report may be based on interference at a first time slot, but during a later time slot of transmission or reception, the interference may be different (e.g., due to scheduling of different beams at the neighboring cell). This difference in interference can lead to under-estimation (e.g., if the CQI is based on less interference) or over-estimation (e.g., if the CQI is based on more interference) of the channel quality, which can result in throughput loss. As another example, the UE may be unable to achieve a target block error rate (BLER) due to high interference during at least one time slot, which can result in outer loop destabilization and throughput loss. As still another example, the UE may select a different antenna panel due to interference from a neighboring cell, which may result in difficulty receiving or transmitting from or to the serving cell, resulting in throughput loss.

Systems and methods of accounting for time-varying, beam-dependent interference are described herein. To illustrate, aspects of the present disclosure describe transmission configuration indication (TCI) signaling for interference coordination. For example, a neighboring base station may transmit, via a backhaul communication, a scheduling message to a serving base station of a UE. The scheduling message indicates one or more beams that are scheduled for upcoming transmissions at the neighboring base station. The serving base station may provide the scheduling message to the UE, and the serving base station, the UE, or both, may perform operations to account for interference caused by the one or more beams. In this manner, the time-varying, beam-dependent interference may be accounted for and throughput loss may be reduced or prevented.

Figure 3:
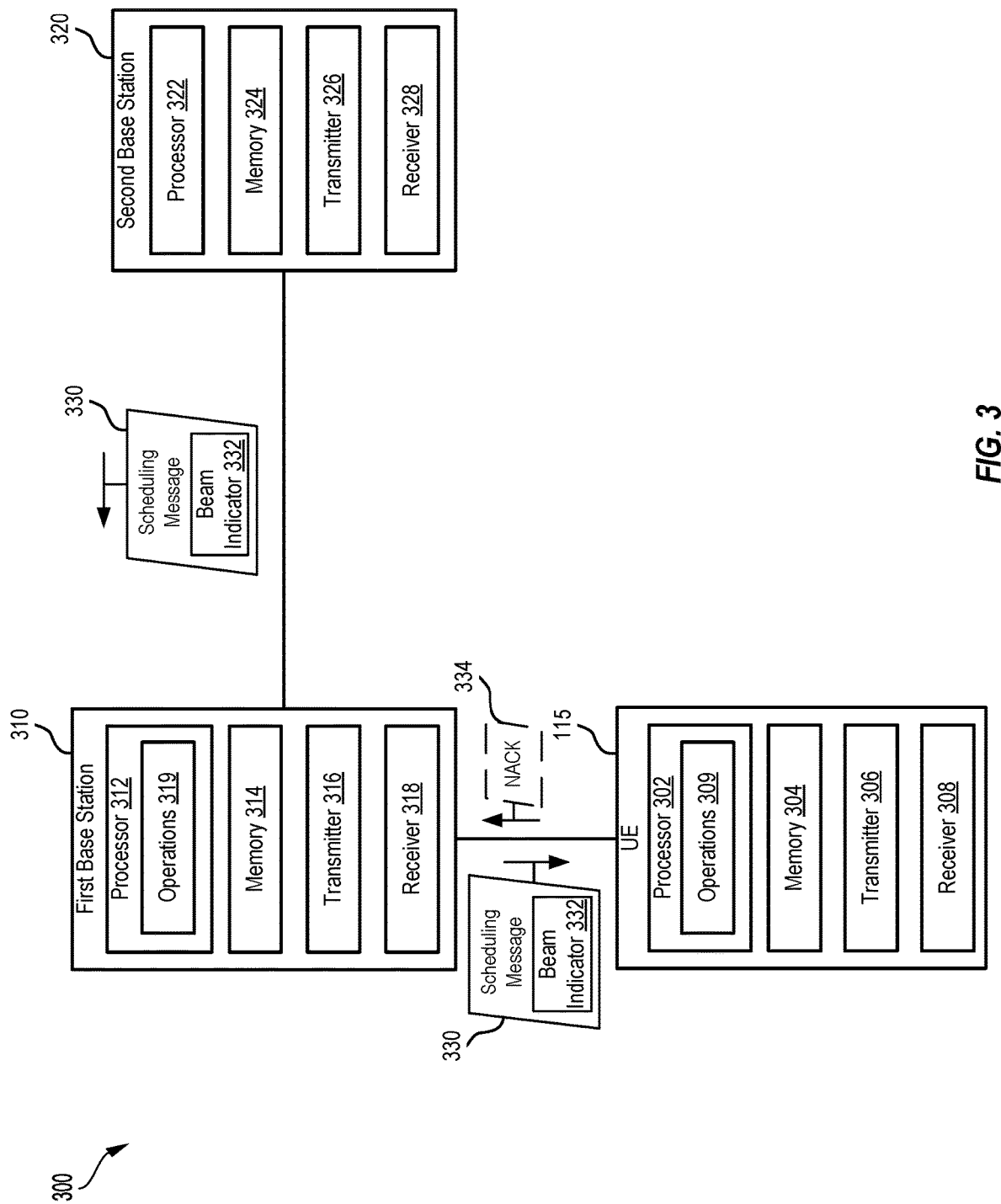
FIG. 3 is a block diagram of a system configured to provide a scheduling message from a neighboring base station to a UE.

FIG. 3 is a block diagram of an example wireless communications system 300 configured to provide a scheduling message from a neighboring base station to a base station (e.g., a serving cell of one or more UEs). In some examples, wireless communications system 300 may implement aspects of wireless network 100. For example, wireless communications system 300 may include UE 115. Wireless communications system 300 may also include a first base station 310 and a second base station 320. Although one UE and two base stations are illustrated, in other implementations, wireless communications system 300 may include multiple UEs 115, more than two base stations, or both.

UE 115 includes a processor 302, a memory 304, a transmitter 306, and a receiver 308. Processor 302 may be configured to execute instructions stored at memory 304 to perform the operations described herein. In some implementations, processor 302 includes or corresponds to controller/processor 280, and memory 304 includes or corresponds to memory 282.

Transmitter 306 is configured to transmit data to one or more other devices, and receiver 308 is configured to receive data from one or more other devices. For example, transmitter 306 may transmit data, and receiver 318 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 306 and receiver 308 may be replaced with a transceiver. Additionally, or alternatively, transmitter 306, receiver 308, or both may include or correspond to one or more components of UE 115 described with reference to FIG. 2.

First base station 310 includes processor 312, memory 314, transmitter 316, and receiver 318. Processor 312 may be configured to execute instructions stored at memory 314 to perform the operations described herein. In some implementations, processor 312 includes or corresponds to controller/processor 240, and memory 314 includes or corresponds to memory 242.

Transmitter 316 is configured to transmit data to one or more other devices, and receiver 318 is configured to receive data from one or more other devices. For example, transmitter 316 may transmit data, and receiver 318 may receive data, via a network, such as a wired network, a wireless network, or a combination thereof. For example, first base station 310 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 316 and receiver 318 may be replaced with a transceiver. Additionally, or alternatively, transmitter 316, receiver, 318, or both may include or correspond to one or more components of base station 105 described with reference to FIG. 2.

Second base station 320 includes processor 322, memory 324, transmitter 326, and receiver 328. Processor 322 may be configured to execute instructions stored at memory 324 to perform the operations described herein.

Transmitter 326 is configured to transmit data to one or more other devices, and receiver 328 is configured to receive data from one or more other devices. For example, transmitter 326 may transmit data, and receiver 328 may receive data, via a network, such as a wired network, a wireless network, or a combination thereof. For example, second base station 320 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 326 and receiver 328 may be replaced with a transceiver. Additionally, or alternatively, transmitter 326, receiver, 328, or both may include or correspond to one or more components of base station 105 described with reference to FIG. 2.

In a particular implementation, wireless communications system 300 implements a fifth generation (5G) New Radio (NR) network. For example, wireless communications system 300 may include multiple 5G-capable UEs 115 and multiple 5G-capable base stations, such as first base station 310 and second base station 320, that are configured to operate in accordance with a 5G NR network protocol such as that defined by the 3GPP. In some implementations, wireless communications system 300 is configured to support wireless communications, such as between UE 115 and first base station 310, in the mmWave band or other high frequencies. Such communications may be performed using narrower, directional beams as compared to communications in the Sub-6 GHz band.

In the example illustrated in FIG. 3, first base station 310 is a serving base station of UE 115, and second base station 320 is a neighboring base station of first base station 310. For example, UE 115 may be located within a first serving cell served by first base station 310, and a neighboring second serving cell may be served by second base station 320. Because the serving cells are neighbors, transmission beams generated by second base station 320 may cause interference with communications between UE 115 and first base station 310.

During operation of wireless communication system 300, UE 115 may associate with first base station 310. For example, UE 115 may enter a serving cell of first base station 310. Second base station 320 is a neighboring base station to first base station 310 (e.g., a serving cell served by second base station 320 neighbors the serving cell served by first base station 310). Thus, transmission beams from second base station 320 may cause interference at UE 115.

To enable first base station 310 and UE 115 to account for potential time-varying, beam-dependent interference from beams generated by second base station 320, second base station 320 may determine a schedule of beams to be used in upcoming time slots. For example, second base station 320 may determine an assignment of beams to time slots for a plurality of upcoming time slots. Second base station 320 may generate a scheduling message 330 indicating one or more beams of second base station 320 that are scheduled for use in upcoming transmissions. For example, scheduling message 330 may include beam indicators 332 that indicate the one or more beams of second base station 320 that are scheduled for use in upcoming transmissions (e.g., for transmissions during one or more upcoming time slots). In some implementations, the one or more beams are indicated by (e.g., the beam indicators 332 include) one or more TCI states corresponding to the one or more beams. Scheduling message 330 may correspond to an upcoming time period (e.g., upcoming time slots) so that, even if there is delay on the backhaul between second base station 320 and first base station 310, or delay between first base station 310 and UE 115, the information reaches the appropriate device (e.g., first base station 310 or UE 115) in time that the information is still relevant. For example, scheduling message 330 may correspond to multiple slots (e.g., time slots), and the multiple slots may be upcoming compared to a current slot at first base station 310 and at UE 115. In some implementations, scheduling message 330 may indicate that one or more slots are unscheduled at second base station 320. For example, scheduling message 330 (e.g., beam indicators 332) may include a blank TCI state corresponding to an unscheduled slot.

After generating scheduling message 330, second base station 320 may transmit, from second base station 320 to first base station 310 via a backhaul communication, scheduling message 330. The backhaul communication may be via a wired communication and/or a wireless communication between second base station 320 and first base station 310. First base station 310 may receive, from second base station 320 via the backhaul communication, scheduling message 330 indicating the one or more beams of second base station 320 that are scheduled for use in upcoming transmissions. After receiving scheduling message 330, first base station 310 may transmit (e.g., forward), to UE 115, scheduling message 330. In this manner, the scheduling of upcoming transmission beams at second base station 320 may be known to first base station 310 and UE 115. Accordingly, UE 115 may perform one or more operations 309 and/or first base station 310 may perform one or more operations 319 to account for potential interference caused by the upcoming scheduled one or more beams, as further described herein.

Figure 4:
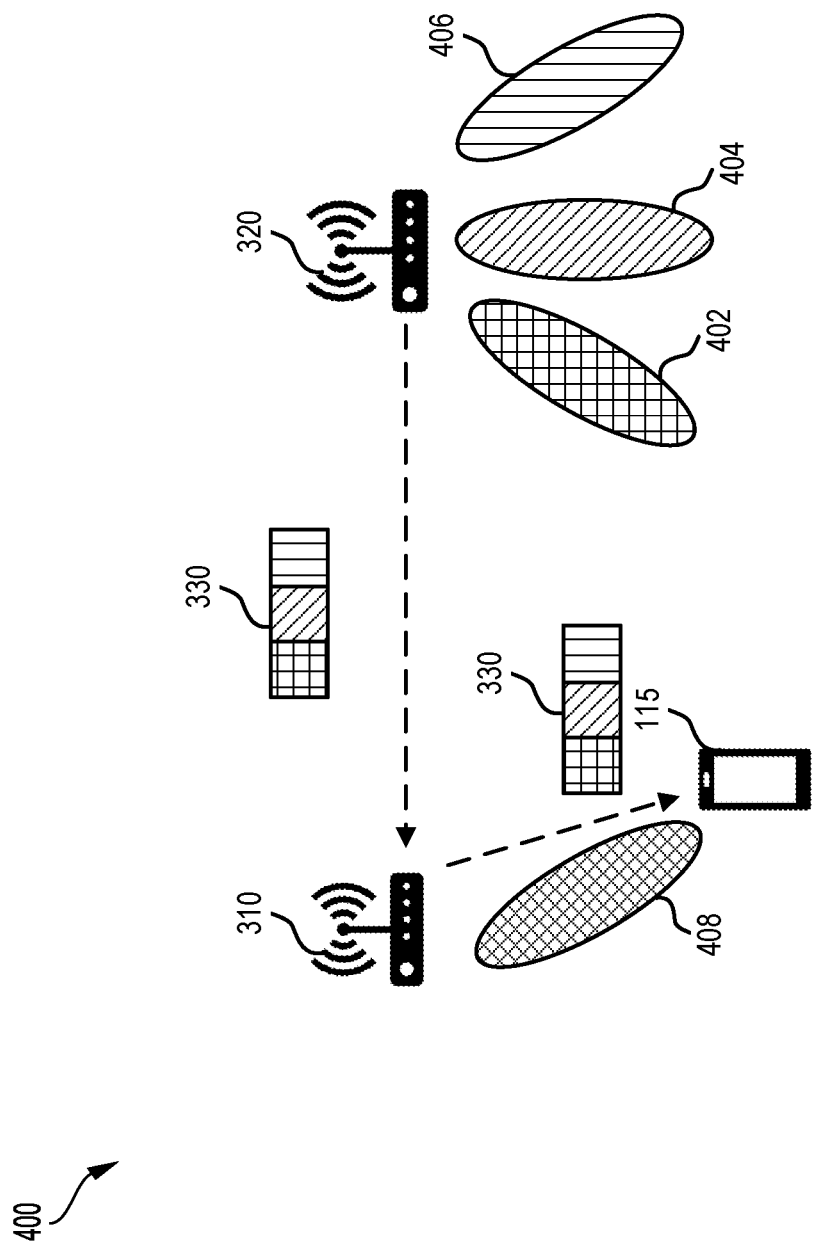
FIG. 4 is a diagram of a system configured to beamform data and to provide a scheduling message from a neighboring base station to a UE.

An example of scheduling beams and sending scheduling messages is shown in FIG. 4. FIG. 4 illustrates a wireless communication system 400 configured to beamform data and to provide a scheduling message from a neighboring base station to a UE. Wireless communication system 400 may include or correspond to wireless communication system 300. For example, wireless communication system 400 may include UE 115, first base station 310, and second base station 320.

As shown in FIG. 4, second base station 320 may communicate with UEs within its serving cell via one or more beams, including a first beam 402, a second beam 404, and a third beam 406. Additionally, first base station 310 may communicate with UE 115 via a fourth beam 408. As shown in FIG. 4, first beam 402 may be directed in a direction of UE 115. Thus, first beam 402 may cause a large amount of interference to signals received by UE 115 from first base station 310 via fourth beam 408. In addition, due to the direction of second beam 404, second beam 404 may cause some interference at UE 115 (though less than first beam 402). Due to the direction of third beam 406 (e.g., in a direction away from UE 115), third beam 406 may be unlikely to cause perceptible interference at UE 115. If first base station 310 and/or UE 115 knows in advance when first beam 402 is going to be used, first base station 310 and/or UE 115 may perform operations to compensate and account for the increased interference cause by first beam 402.

To provide first base station 310 and UE 115 with information of when first beam 402 is going to be used, second base station 320 may determine scheduling of beams in advance and generate scheduling message 330. For example, second base station 320 may schedule beams to be used over the next M slots, where M is an integer. In the example of FIG. 4, M is three, and scheduling message 330 indicates that a first time slot is assigned to first beam 402, a second time slot is assigned to second beam 404, and a third time slot is assigned to third beam 406. Second base station 320 may transmit scheduling message 330 to first base station 310 via a backhaul communication, and first base station 310 may transmit (e.g., forward) scheduling message 330 to UE 115. For example, on slot N-K, first base station 310 may indicate to UE 115 (and in some implementations to other served UEs) a list of interferer TCIs for slots N to N+M−1. In this manner, first base station 310 and/or UE 115 can perform operations during the first time slot (e.g., the Nth time slot) to account for the interference provided by first beam 402, as further described herein. K may selected to account for the delay between second base station 320 and first base station 310 and/or the delay between first base station 310 and UE 115.

Returning to FIG. 3, scheduling message 330 may be transmitted from first base station 310 to UE 115 using different techniques. In some implementations, transmitting scheduling message 330 from first base station 310 to UE 115 includes broadcasting scheduling message 330 in one or more synchronization signal block (SSB) beams to one or more UEs (including UE 115). Because the information in scheduling message 330 may be beneficial to multiple UEs within the serving cell of first base station 310, broadcasting scheduling message 330 to the UEs of the serving cell via one or more SSB beams may reduce network overhead as compared to unicasting scheduling message 330 to each UE (or to UEs that are determined by first base station 310 to benefit from the information). Thus, scheduling message 330 may be received in one or more SSB beams received at UE 115. In some such implementations, scheduling message 330 may be included in a group common-physical downlink control channel (GC-PDCCH) or a similar message according to a 5G NR wireless communication standard specification. For example, scheduling message 330 may be received in a GC-PDCCH at UE 115 (and other UEs). To illustrate, the GC-PDCCH may include control information that indicates slots that are reserved for downlink and uplink, in addition to slots that are used by the neighboring cell (e.g., by second base station 320).

In some such implementations, scheduling message 330 may include an element for each slot from a defined list of elements for a neighbor cell corresponding to second base station 320. The elements may indicate the one or more beams and may include TCI states used by second base station 320. For example, beam indicators 332 may include, for each slot (e.g., time slot) of the upcoming slots scheduled by second base station 320, a corresponding TCI state for the beam scheduled for use by second base station 320. In some such implementations, the list of elements is defined at a radio resource control (RRC) level. For example, the list of elements may be defined by higher layer signaling. The list of elements may be defined for more than just the serving cell of second base station 320. For example, the list of elements may be defined for multiple neighboring cells corresponding to multiple physical cell identities (PCIs). Thus, if there are multiple neighboring cells that may cause interference to UE 115, first base station 310 may receive scheduling messages from multiple neighboring base stations and aggregate the multiple scheduling messages into a single scheduling message (or may broadcast each scheduling message individually).

In some other implementations, transmitting scheduling message 330 to UE 115 may include transmitting scheduling message 330 as a unicast message to UE 115. For example, scheduling message 330 may be received as a unicast message at UE 115 (and not at other UEs). In some such implementations, using unicast transmissions (instead of broadcast transmissions) may be preferable if only one (or a few) UEs can make use of the scheduling information, thus signaling overhead may be reduced by sending scheduling message 330 only to particular UEs. In some such implementations, scheduling message 330 may be included in a scheduling downlink control information (DCI) transmission from first base station 310 to UE 115. For example, beam indicators 332 may be included in one or more bits of a scheduling DCI (e.g., a grant) from first base station 310 (e.g., a message that indicates scheduling by first base station 310 for UE 115). Including scheduling message 330 in a scheduling DCI may reduce signaling overhead by including the information in an already existing message (e.g., the scheduling DCI). However, if the scheduling information is sufficiently large, an existing DCI message may not have enough extra bits available to include all of the scheduling information. Thus, in some other implementations, scheduling message 330 may be included in a dedicated DCI transmission from first base station 310 to UE 115. For example, a new type of message (e.g., a new dedicated DCI) may be used to transmit scheduling message 330 from first base station 310 to UE 115. Such a message may be able to accommodate larger schedules than if scheduling message 330 is included in an already existing scheduling DCI.

In some such implementations, scheduling message 330 may include an element for each slot from a defined list of elements for a neighbor cell corresponding to second base station 320. The elements may indicate the one or more beams and may include TCI states used by second base station 320. For example, beam indicators 332 may include, for each slot (e.g., time slot) of the upcoming slots scheduled by second base station 320, a corresponding TCI state for the beam scheduled for use by second base station 320. In some such implementations, the list of elements may be defined at the RRC level. For example, the list of elements may be defined by higher layer signaling. The list of elements may be defined for more than just the serving cell of second base station 320. For example, the list of elements may be defined for multiple neighboring cells corresponding to multiple physical cell identities (PCIs). Thus, if there are multiple neighboring cells that may cause interference to UE 115, first base station 310 may receive scheduling messages from multiple neighboring base stations and aggregate the multiple scheduling messages into a single scheduling message for transmission to UE 115 (or first base station 310 may unicast each scheduling message individually to UE 115).

Upon receiving scheduling message 330, first base station 310 and/or UE 115 may perform operations to account for potential interference from beams of second base station 320. To illustrate, first base station 310 may perform one or more of operations 319 during time slots corresponding to at least one beam that is expected to cause a high level of interference at UE 115 (e.g., time slots assigned to first beam 402 of FIG. 4). In some implementations, operations 319 may include rescheduling one or more transmissions. However, this may be difficult given the requirements at first base station 310. In some other implementations, operations 319 may include operations in addition to rescheduling transmissions. As an example, operations 319 may include reducing a rank for scheduling transmissions to or from UE 115 during at least one slot that corresponds to the at least one beam. To illustrate, during a time slot during which first beam 402 is scheduled for use in transmission by second base station 320, first base station 310 may reduce a rank of a transmission from first base station 310 to UE 115 (e.g., via fourth beam 408). As another example, operations 319 may include reducing a modulation and coding scheme (MCS) corresponding to transmissions to or from UE 115 during at least one slot that corresponds to the at least one beam. To illustrate, during a time slot during which first beam 402 is scheduled for use in transmission by second base station 320, first base station 310 may reduce a MCS used to transmit data to or receive data from UE 115. As another example, operations 319 may include selecting a different precoder for scheduling transmissions to or from UE 115 during at least one slot that corresponds to the at least one beam. To illustrate, during a time slot during which first beam 402 is scheduled for use in transmission by second base station 320, first base station 310 may change to a less complex precoder for transmitting data to or receiving data from UE 115. As another example, operations 319 may include allocating a larger frequency domain for transmissions to or from UE 115 during at least one slot that corresponds to the at least one beam. To illustrate, during a time slot during which first beam 402 is scheduled for use in transmission by second base station 320, first base station 310 may allocate a larger frequency domain (as compared to other time slots) to transmissions to or from UE 115. For example, first base station 310 may allocate additional resource blocks in the frequency domain to communications between first base station 310 and UE 115 during the time slot. As another example, operations 319 may include enabling slot aggregation for transmissions to or from UE 115 during at least one slot that corresponds to the at least one beam. To illustrate, during a time slot during which first beam 402 is scheduled for use in transmission by second base station 320, first base station 310 may enable slot aggregation for transmissions to UE 115, which repeats some information in transmissions over different time slots. Operations 319 may reduce or prevent throughput loss that would otherwise be caused by interference from beams (such as first beam 402) of second base station 320.

Operations 319 may also include operations to maintain consistency of a link adaptation mechanism (e.g., the outer loop). Typically, during high interference situations in which a UE fails to receive a transmission from a serving base station, the serving base station may receive a negative acknowledgement (NACK) from the UE indicating that a transmission was not received. Based on the NACK, the serving base station may reduce a MCS by a negative offset and retry the transmission to the UE. Reducing the MCS and retransmitting the message may reduce throughput throughout the network. However, first base station 310 may perform operations 319 to reduce or prevent throughput loss from such link adaptation. As an example, first base station 310 may identify at least one beam of the one or more beams corresponding to a high level of interference (e.g., based on scheduling message 330) at UE 115, and first base station 310 may receive a NACK 334 during a slot corresponding to the at least one beam from UE 115. Based on the identification of the at least one beam as an interfering beam (based on scheduling message 330), first base station 310 may refrain from adjusting a MCS based on NACK 334. Maintaining the MCS may improve throughput within wireless communications system 300 during a time slot that is not scheduled for use with an interfering beam (e.g., first beam 402 of FIG. 4). Alternatively, based on the identification of the at least one beam as an interfering beam (based on scheduling message 330), first base station 310 may reduce an adjustment amount for the MCS based on NACK 334, and first base station 310 may reduce the MCS based on the reduced adjustment amount. Reducing the adjustment amount (e.g., adaptively selecting the adjustment offset) of the MCS may improve throughput within wireless communications system 300 during a time slot that is not scheduled for use with an interfering beam (e.g., first beam 402 of FIG. 4).

Additionally or alternatively, UE 115 may perform one or more of operations 309 to account for potential interference at UE 115 from beams generated by second base station 320. To illustrate, UE 115 may perform one or more of operations 309 during time slots corresponding to at least one beam that is expected to cause a high level of interference at UE 115 (e.g., time slots assigned to first beam 402 of FIG. 4). For example, UE 115 may identify at least one beam of the one or more beams corresponding to a high level of interference at UE 115 (e.g., first beam 402 of FIG. 4, identified based on scheduling message 330), and UE 115 may enable a different antenna panel during a slot corresponding to the at least one beam. To illustrate, during a time slot during which first beam 402 is scheduled for use in transmission by second base station 320, UE 115 may select an antenna panel that is not as much in the path of first beam 402. The selected antenna panel may be able to receive a signal from first base station 310 with reduced impact from the interfering beam. As another example, UE 115 may identify at least one beam of the one or more beams corresponding to a high level of interference at UE 115 and may enable interference detection and cancellation operations during a slot corresponding to the at least one beam. To illustrate, during a time slot during which first beam 402 is scheduled for use in transmission by second base station 320, UE 115 may enable interference detection and cancellation operations. Such operations may consume additional battery power, such that UE 115 may use them selectively (e.g., when an interfering beam is scheduled for transmission). As another example, UE 115 may identify at least one beam of the one or more beams corresponding to a high level of interference at UE 115 and may perform channel estimation based on previous interference corresponding to the at least one beam during a slot corresponding to the at least one beam. For example, UE 115 may detect interference during a previous time slot during which first beam 402 is generated, and during another time slot during which first beam 402 is scheduled for use in transmission, UE 115 may perform channel estimation based on the detected interference from the previous time slot. Operations 309 may reduce or prevent throughput loss that would otherwise be caused by interference from beams (such as first beam 402) of second base station 320.

As described above with reference to FIG. 3, wireless communications system 300 may be configured to share scheduling information between neighboring base stations. For example, second base station 320 may transmit scheduling message 330 to first base station 310 (e.g., a neighboring base station) via a backhaul communication. First base station 310 may share scheduling message 330 with UE 115 within its serving cell. By receiving information (e.g., TCI states) of a schedule of upcoming beams that are to be used for transmissions by second base station 320, first base station 310 may perform operations 319, UE 115 may perform operations 309, or both. Performance of operations 309, operations 319, or both, may reduce or prevent throughput loss that would otherwise be caused by interference from at least some beams generated by second base station 320.

Figures 5, 6:
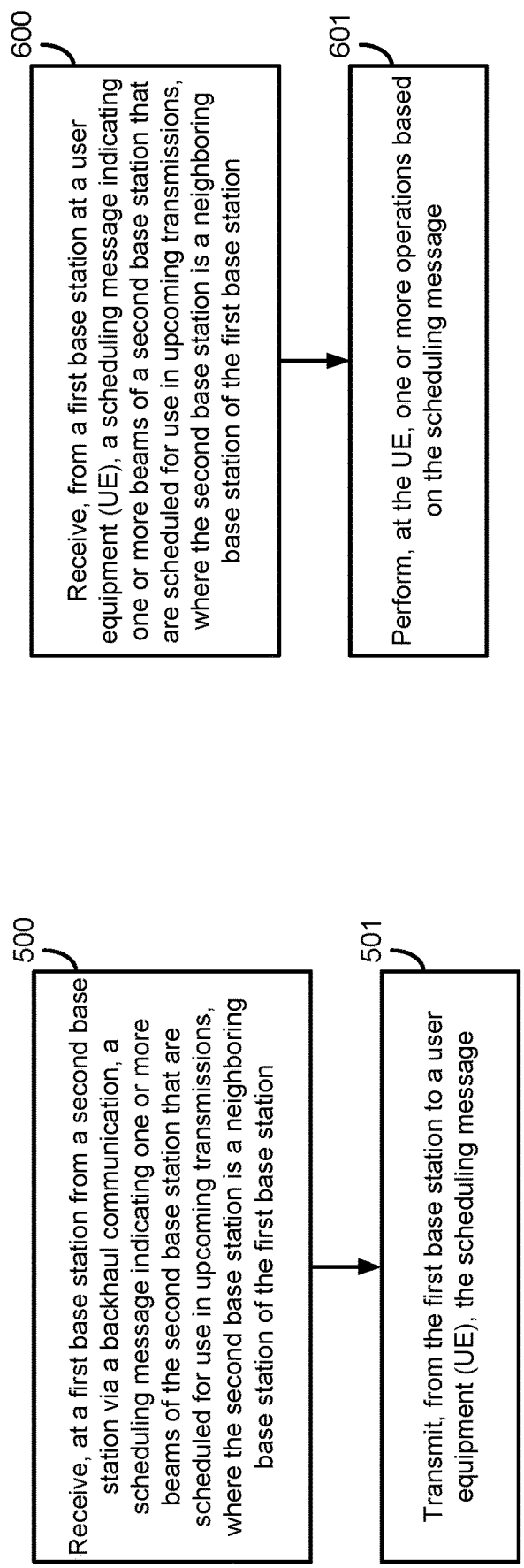
FIG. 5 is a block diagram illustrating example blocks executed by a base station configured according to one or more aspects of the present disclosure.
FIG. 6 is a block diagram illustrating example blocks executed by a UE configured according to one or more aspects of the present disclosure.
Figure 8:
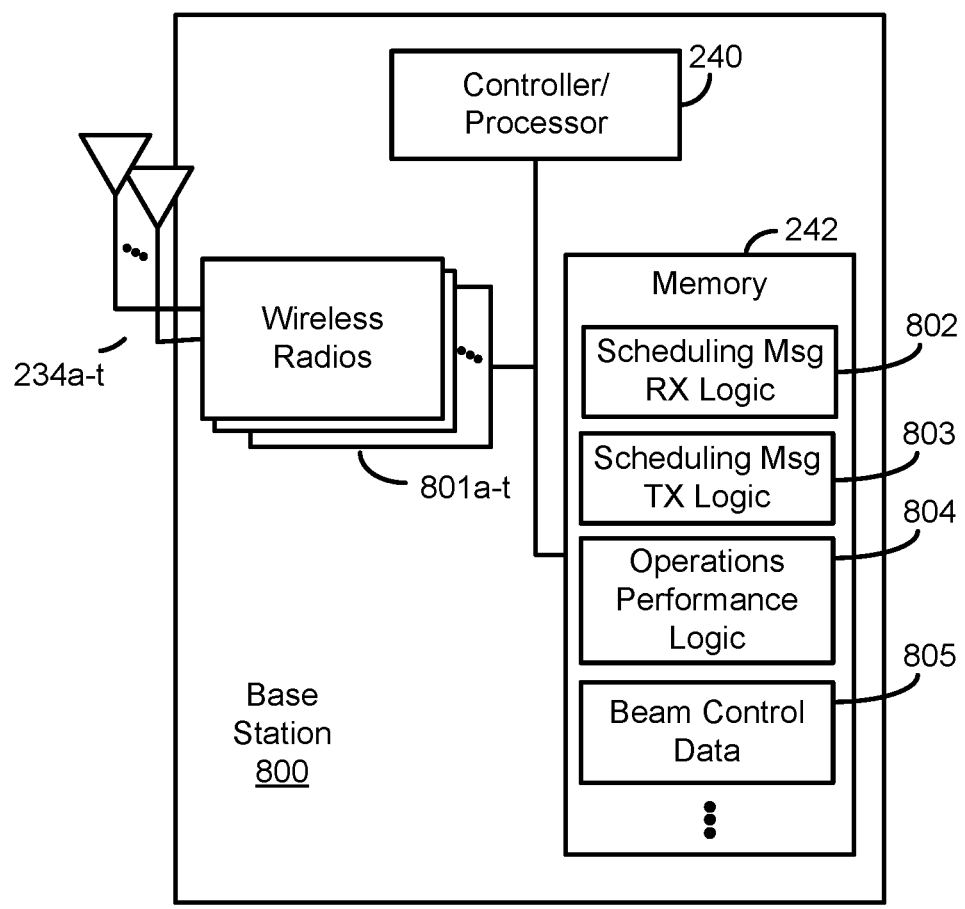
FIG. 8 is a block diagram conceptually illustrating a design of a base station configured to transmit a scheduling message from a neighboring base station to a UE according to some aspects of the present disclosure.

FIG. 5 is a block diagram illustrating example blocks executed to implement one or more aspects of the present disclosure. The example blocks will also be described with respect to base station 800 as illustrated in FIG. 8. FIG. 8 is a block diagram illustrating base station 800 configured according to one or more aspects of the present disclosure. In some implementations, base station 800 may include or correspond to base station 105 of FIGS. 1 and 2 or first base station 310 of FIGS. 3 and 4. Base station 800 may include the structure, hardware, and components as illustrated for base station 105 of FIG. 2. For example, base station 800 may include controller/processor 240, which operates to execute logic or computer instructions stored in memory 242, as well as controlling the components of base station 800 that provide the features and functionality of base station 800. Base station 800, under control of controller/processor 240, may transmit and receive signals via wireless radios 801a-t and antennas 234a-t. Wireless radios 801a-t may include various components and hardware, as illustrated in FIG. 2 for base station 105, including modulator/demodulators 232a-t, MIMO detector 236, receive processor 238, transmit processor 220, and TX MIMO processor 230.

At block 500, a first base station receives, from a second base station via a backhaul communication, a scheduling message indicating one or more beams of the second base station that are scheduled for use in upcoming transmissions. The second base station is a neighboring base station of the first base station. For example, base station 800 may execute, under control of controller/processor 240, scheduling message RX logic 802 stored in memory 242. The execution environment of scheduling message RX logic 802 provides the functionality for base station 800 to receive, via antennas 234a-t, a scheduling message that indicates one or more beams of a second base station that are scheduled for use in upcoming transmissions.

At block 501, the first base station transmits, to a UE, the scheduling message. For example, base station 800 may execute, under control of controller/processor 240, scheduling message TX logic 803 stored in memory 242. The execution environment of scheduling message TX logic 803 provides the functionality for base station 800 to transmit, via antennas 234a-t, the scheduling message to a UE. In some implementations, controller/processor 240 may access beam control data 805 to determine how to transmit the scheduling message to the UE. For example, beam control data 805 may indicate to broadcast the scheduling message as one or more SSB beams to multiple UEs or to unicast the scheduling message to the UE, in some implementations in a scheduling DCI message or a dedicated DCI message.

In some implementations, the first base station may perform one or more operations based on the scheduling message. For example, base station 800 may execute, under control of controller/processor 240, operations performance logic 804 stored in memory 242. The execution environment of operations performance logic 804 provides the functionality for base station 800 to perform one or more operations based on the scheduling message. For example, the one or more operations may include reducing a rank for scheduling transmissions to or from the UE, reducing a MCS corresponding to transmissions to or from the UE, selecting a different precoder for scheduling transmissions to or from the UE, enabling slot aggregation for transmissions to or from the UE, refraining from adjusting a MCS based on a NACK from the UE (or reducing an amount that is adjusted based on the NACK), or a combination thereof, as non-limiting examples.

Figure 9:
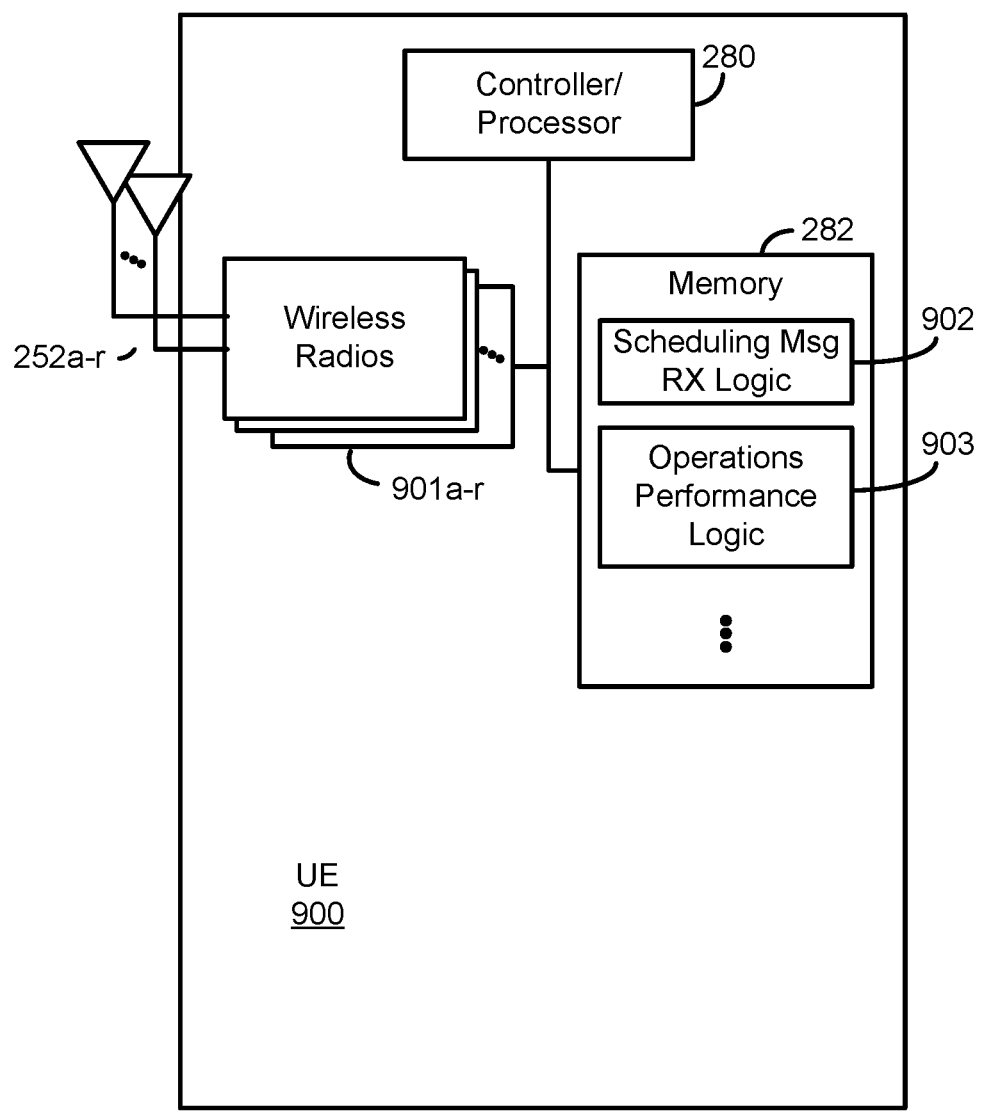
FIG. 9 is a block diagram conceptually illustrating a design of a UE configured to receive a scheduling message corresponding to a neighboring base station according to some aspects of the present disclosure.

FIG. 6 is a block diagram illustrating example blocks executed to implement one or more aspects of the present disclosure. The example blocks will also be described with respect to UE 900 as illustrated in FIG. 9. FIG. 9 is a block diagram illustrating UE 900 configured according to one or more aspects of the present disclosure. In some implementations, UE 900 may include or correspond to UE 115 of FIGS. 1-4. UE 900 may include the structure, hardware, and components as illustrated for UE 115 of FIG. 2. For example, UE 900 may include controller/processor 280, which operates to execute logic or computer instructions stored in memory 282, as well as controlling the components of UE 900 that provide the features and functionality of UE 900. UE 900, under control of controller/processor 280, may transmit and receive signals via wireless radios 901a-r and antennas 252a-r. Wireless radios 901a-r may include various components and hardware, as illustrated in FIG. 2 for UE 115, including modulator/demodulators 254a-r, MIMO detector 256, receive processor 258, transmit processor 264, and TX MIMO processor 266.

At block 600, a UE receives, from a first base station, a scheduling message indicating one or more beams of a second base station that are scheduled for use in upcoming transmissions. The second base station is a neighboring base station of the first base station. For example, UE 900 may execute, under control of controller/processor 280, scheduling message RX logic 902 stored in memory 282. The execution environment of scheduling message RX logic 902 provides the functionality for UE 900 to receive, via antennas 252a-r, a scheduling message that indicates one or more beams of a second base station that are scheduled for use in upcoming transmissions.

At block 601, the UE performs one or more operations based on the scheduling message. For example, UE 900 may execute, under control of controller/processor 280, operations performance logic 903 stored in memory 282. The execution environment of operations performance logic 903 provides the functionality for UE 900 to perform one or more operations based on the scheduling message. In some implementations, the one or more operations may include enabling a different antenna panel, enabling interference detection and cancellation operations, performing channel estimation based on previous interference, or a combination thereof, as non-limiting examples.

Figure 7:
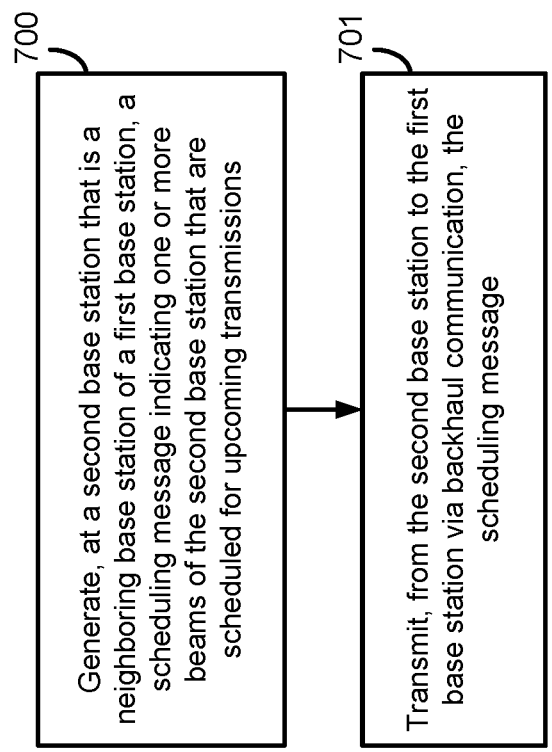
FIG. 7 is a block diagram illustrating example blocks executed by a base station configured according to one or more aspects of the present disclosure.
Figure 10:
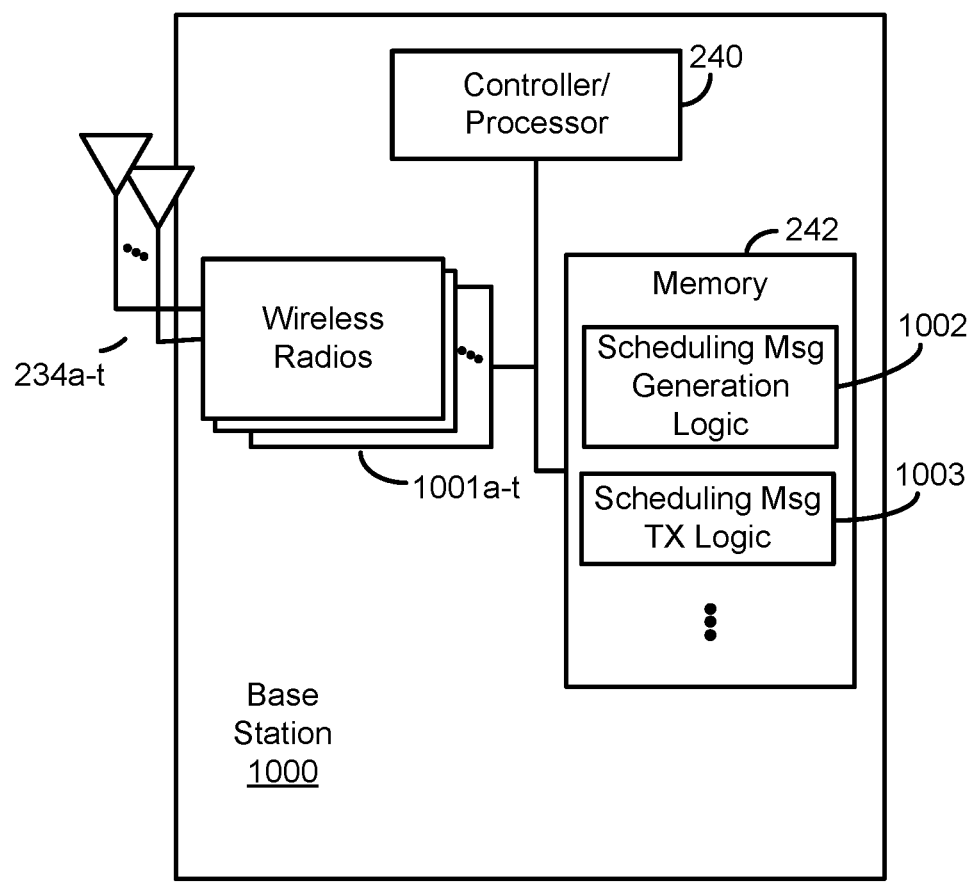
FIG. 10 is a block diagram conceptually illustrating a design of a base station configured to transmit a scheduling message to a neighboring base station according to some aspects of the present disclosure.

FIG. 7 is a block diagram illustrating example blocks executed to implement one or more aspects of the present disclosure. The example blocks will also be described with respect to base station 1000 as illustrated in FIG. 10. FIG. 10 is a block diagram illustrating base station 1000 configured according to one or more aspects of the present disclosure. In some implementations, base station 1000 may include or correspond to base station 105 of FIGS. 1 and 2 or second base station 320 of FIGS. 3 and 4. Base station 1000 may include the structure, hardware, and components as illustrated for base station 105 of FIG. 2. For example, base station 1000 may include controller/processor 240, which operates to execute logic or computer instructions stored in memory 242, as well as controlling the components of base station 1000 that provide the features and functionality of base station 1000. Base station 1000, under control of controller/processor 240, may transmit and receive signals via wireless radios 1001a-t and antennas 234a-t. Wireless radios 1001a-t may include various components and hardware, as illustrated in FIG. 2 for base station 105, including modulator/demodulators 232a-t, MIMO detector 236, receive processor 238, transmit processor 220, and TX MIMO processor 230.

At block 700, a second base station that is a neighboring base station of a first base station generates a scheduling message indicating one or more beams of the second base station that are scheduled for upcoming transmissions. For example, base station 1000 may execute, under control of controller/processor 240, scheduling message generation logic 1002 stored in memory 242. The execution environment of scheduling message generation logic 1002 provides the functionality for base station 1000 to generate a scheduling message that indicates one or more beams of base station 1000 that are scheduled for use in upcoming transmissions.

At block 701, the second base station transmits, to the first base station via a backhaul communication, the scheduling message. For example, base station 1000 may execute, under control of controller/processor 240, scheduling message TX logic 1003 stored in memory 242. The execution environment of scheduling message TX logic 1003 provides the functionality for base station 1000 to transmit, via antennas 234a-t, the scheduling message to a first base station (e.g., a neighboring base station).

In some aspects, techniques for enabling neighbor TCI signaling for interference coordination may include additional aspects, such as any single aspect or any combination of aspects described below or in connection with one or more other processes or devices described elsewhere herein. In some aspects, enabling neighbor TCI signaling for interference coordination may include an apparatus configured to receive, at a first base station from a second base station via a backhaul communication, a scheduling message indicating one or more beams of the second base station that are scheduled for use in upcoming transmissions. The second base station is a neighboring base station of the first base station. The apparatus may further be configured to transmit, from the first base station to a UE, the scheduling message. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, transmitting the scheduling message to the UE includes broadcasting the scheduling message in one or more synchronization signal block (SSB) beams to one or more UEs. The one or more UEs include the UE.

In a second aspect, in combination with the first aspect, transmitting the scheduling message includes transmitting a group common-physical downlink control channel (GC-PDCCH) that includes the scheduling message.

In a third aspect, in combination with one or more of the first through second aspects, the scheduling message includes an element for each slot from a defined list of elements for a neighbor cell corresponding to the second base station. The elements indicate the one or more beams and include transmission configuration indication (TCI) states used by the second base station. The list of elements is defined at a radio resource control (RRC) level, the list of elements is defined for multiple neighboring cells corresponding to multiple physical cell identities (PCIs), or both.

In a fourth aspect, alone or in combination with one or more of the first through third aspects, at least one beam of the one or more beams corresponds to a high level of interference at the UE. The apparatus reduces a rank for scheduling transmissions to or from the UE during at least one slot that corresponds to the at least one beam.

In a fifth aspect, alone or in combination with one or more of the first through fourth aspects, at least one beam of the one or more beams corresponds to a high level of interference at the UE. The apparatus reduces a modulation and coding scheme corresponding to transmissions to or from the UE during at least one slot that corresponds to the at least one beam.

In a sixth aspect, alone or in combination with one or more of the first through fifth aspects, at least one beam of the one or more beams corresponds to a high level of interference at the UE. The apparatus selects a different precoder for scheduling transmissions to or from the UE during at least one slot that corresponds to the at least one beam.

In a seventh aspect, alone or in combination with one or more of the first through sixth aspects, at least one beam of the one or more beams corresponds to a high level of interference at the UE. The apparatus allocates a larger frequency domain for transmissions to or from the UE during at least one slot that corresponds to the at least one beam.

In an eighth aspect, alone or in combination with one or more of the first seventh aspects, at least one beam of the one or more beams corresponds to a high level of interference at the UE. The apparatus enables slot aggregation for transmissions to or from the UE during at least one slot that corresponds to the at least one beam.

In a ninth aspect, alone or in combination with one or more of the first through eighth aspects, the apparatus identifies at least one beam of the one or more beams corresponding to a high level of interference at the UE.

In a tenth aspect, alone or in combination with the ninth aspect, the apparatus receives a negative acknowledgement (NACK) during a slot corresponding to the at least one beam.

In an eleventh aspect, alone or in combination with one or more of the ninth through tenth aspects, the apparatus refrains from adjusting a modulation and coding scheme (MCS) based on the NACK.

In a twelfth aspect, alone or in combination with one or more of the first through eleventh aspects, the apparatus identifies at least one beam of the one or more beams corresponding to a high level of interference at the UE.

In a thirteenth aspect, alone or in combination with the twelfth aspect, the apparatus receives a negative acknowledgement (NACK) during a slot corresponding to the at least one beam.

In a fourteenth aspect, alone or in combination with one or more of the twelfth through thirteenth aspects, the apparatus reduces an adjustment amount based on the NACK.

In a fifteenth aspect, alone or in combination with one or more of the twelfth through fourteenth aspects, the apparatus reduces a modulation and coding scheme based on the reduced adjustment amount.

In a sixteenth aspect, alone or in combination with one or more of the first through fifteenth aspects, the one or more beams are indicated by one or more transmission configuration indication (TCI) states corresponding to the one or more beams.

In a seventeenth aspect, alone or in combination with one or more of the first through sixteenth aspects, the scheduling message corresponds to multiple slots, and the multiple slots are upcoming compared to a current slot at the first base station.

In an eighteenth aspect, alone or in combination with one or more of the first through seventeenth aspects, the scheduling message includes a blank transmission configuration indication (TCI) state corresponding to an unscheduled slot.

In a nineteenth aspect, alone or in combination with one or more of the first through eighteenth aspects, initiating transmission of the scheduling message to the UE includes initiating transmission of the scheduling message as a unicast message to the UE, a downlink control information (DCI) message to the UE, or both.

In some aspects, an apparatus configured for wireless communication, such as a wireless communication device, is configured to receive, from a first base station at a UE, a scheduling message indicating one or more beams of a second base station that are scheduled for use in upcoming transmissions. The second base station is a neighboring base station of the first base station. The apparatus is further configured to perform one or more operations based on the scheduling message. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a twentieth aspect, receiving the scheduling message includes receiving one or more synchronization signal block (SSB) beams that include the scheduling message.

In a twenty-first aspect, in combination with the twentieth aspect, receiving the scheduling message includes receiving a group common-physical downlink control channel (GC-PDCCH) that includes the scheduling message.

In a twenty-second aspect, in combination with one or more of the twentieth through twenty-first aspects, the scheduling message includes an element for each slot from a defined list of elements for a neighbor cell corresponding to the second base station. The elements indicate the one or more beams and including transmission configuration indication (TCI) states used by the second base station. The list of elements is defined at a radio resource control (RRC) level, wherein the list of elements is defined for multiple neighboring cells corresponding to multiple physical cell identities (PCIs), or both.

In a twenty-third aspect, alone or in combination with one or more of the twentieth through twenty-second aspects, receiving the scheduling message includes receiving a unicast message from the first base station, a scheduling downlink control information (DCI) message from the first base station, or both.

In a twenty-fourth aspect, in combination with the twenty-third aspect, the scheduling message includes an element for each slot from a defined list of elements for a neighbor cell corresponding to the second base station. The elements indicate the one or more beams and including transmission configuration indication (TCI) states used by the second base station.

In a twenty-fifth aspect, alone or in combination with one or more of the twentieth through twenty-fourth aspects, the one or more operations include identifying at least one beam of the one or more beams corresponding to a high level of interference at the UE and enabling a different antenna panel during a slot corresponding to the at least one beam.

In a twenty-sixth aspect, alone or in combination with one or more of the twentieth through twenty-fifth aspects, the one or more operations include identifying at least one beam of the one or more beams corresponding to a high level of interference at the UE and enabling interference detection and cancellation operations during a slot corresponding to the at least one beam.

In a twenty-seventh aspect, alone or in combination with one or more of the twentieth through twenty-sixth aspects, identifying at least one beam of the one or more beams corresponding to a high level of interference at the UE and performing channel estimation based on previous interference corresponding to the at least one beam during a slot corresponding to the at least one beam.

In a twenty-eighth aspect, alone or in combination with one or more of the twentieth through twenty-seventh aspects, the one or more beams are indicated by one or more transmission configuration indication (TCI) states corresponding to the one or more beams.

In a twenty-ninth aspect, alone or in combination with one or more of the twentieth through twenty-eighth aspects, the scheduling message corresponds to multiple slots, and the multiple slots are upcoming compared to a current slot at the UE.

In a thirtieth aspect, alone or in combination with one or more of the twentieth through twenty-ninth aspects, the scheduling message includes a blank transmission configuration indication (TCI) state corresponding to an unscheduled slot.

In a thirty-first aspect, alone or in combination with one or more of the twentieth through thirtieth aspects, receiving the scheduling message includes receiving a unicast message from the first base station, a scheduling downlink control information (DCI) message from the first base station, or both. The scheduling message includes an element for each slot from a defined list of elements for a neighbor cell corresponding to the second base station. The elements indicate the one or more beams and including transmission configuration indication (TCI) states used by the second base station.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIGS. 1-4 and 8-10) may comprise processors, electronics devices, hardware devices, electronics components, logical circuits, memories, software codes, firmware codes, etc., or any combination thereof. In addition, features discussed herein relating to 1-4 and 8-10 may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 5-7) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be implemented directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, the method comprising:

receiving, via a backhaul communication and at a first base station from a second base station that is a neighboring base station of the first base station, a scheduling message; and transmitting, from the first base station to a user equipment (UE) served by the first base station, the scheduling message, wherein the scheduling message includes one or more elements for one or more upcoming slots scheduled for use by the second base station, the one or more elements indicating one or more beams of the second base station that are scheduled for use in upcoming transmissions to one or more second UEs served by the second base station and including transmission configuration indication (TCI) states used by the second base station.

2. The method of claim 1, wherein transmitting the scheduling message to the UE comprises broadcasting the scheduling message in one or more synchronization signal block (SSB) beams to one or more third UEs, the one or more third UEs including the UE.

3. The method of claim 2, wherein transmitting the scheduling message comprises transmitting a group common-physical downlink control channel (GC-PDCCH) that includes the scheduling message, and wherein the GC-PDCCH includes control information indicating the one or more upcoming slots that are reserved for use by the second base station.

4. The method of claim 1, wherein the one or more elements are defined at a radio resource control (RRC) level for multiple neighboring cells corresponding to multiple physical cell identities (PCIs).

5. The method of claim 1, wherein at least one beam of the one or more beams corresponds to a high level of interference at the UE, and further comprising reducing a rank for scheduling transmissions to or from the UE during at least one slot that corresponds to the at least one beam.

6. The method of claim 1, wherein at least one beam of the one or more beams corresponds to a high level of interference at the UE, and further comprising reducing a modulation and coding scheme corresponding to transmissions to or from the UE during at least one slot that corresponds to the at least one beam.

7. The method of claim 1, wherein at least one beam of the one or more beams corresponds to a high level of interference at the UE, and further comprising selecting a different precoder for scheduling transmissions to or from the UE during at least one slot that corresponds to the at least one beam.

8. The method of claim 1, wherein at least one beam of the one or more beams corresponds to a high level of interference at the UE, and further comprising allocating a larger frequency domain for transmissions to or from the UE during at least one slot that corresponds to the at least one beam.

9. The method of claim 1, wherein at least one beam of the one or more beams corresponds to a high level of interference at the UE, and further comprising enabling slot aggregation for transmissions to or from the UE during at least one slot that corresponds to the at least one beam.

10. The method of claim 1, further comprising:
identifying at least one beam of the one or more beams corresponding to a high level of interference at the UE;
receiving a negative acknowledgement (NACK) during a slot corresponding to the at least one beam; and
refraining from adjusting a modulation and coding scheme (MCS) based on the NACK.

11. The method of claim 1, further comprising:
identifying at least one beam of the one or more beams corresponding to a high level of interference at the UE;
receiving a negative acknowledgement (NACK) during a slot corresponding to the at least one beam;
reducing an adjustment amount based on the NACK; and
reducing a modulation and coding scheme based on the reduced adjustment amount.

12. An apparatus configured for wireless communication, the apparatus comprising:
at least one processor; and
a memory coupled to the at least one processor,
wherein the at least one processor is configured to:
receive, via a backhaul communication and at a first base station from a second base station that is a neighboring base station of the first base station, a scheduling message; and
initiate transmission, from the first base station to a user equipment (UE) served by the first base station, of the scheduling message, wherein the scheduling message includes one or more elements for one or more upcoming slots scheduled for use by the second base station, the one or more elements indicating one or more beams of the second base station that are scheduled for use in upcoming transmissions to one or more second UEs served by the second base station and including transmission configuration indication (TCI) states used by the second base station.

13. The apparatus of claim 12, wherein the one or more beams are indicated by the TCI states corresponding to the one or more beams.

14. The apparatus of claim 12, wherein the scheduling message corresponds to multiple slots, and wherein the multiple slots are upcoming compared to a current slot at the first base station.

15. The apparatus of claim 12, wherein the scheduling message includes a blank transmission configuration indication (TCI) state corresponding to an unscheduled slot.

16. The apparatus of claim 12, wherein initiating transmission of the scheduling message to the UE comprises initiating transmission of the scheduling message as a unicast message to the UE, a downlink control information (DCI) message to the UE, or both.

17. A method of wireless communication, the method comprising:
receiving, from a first base station at a user equipment (UE) served by the first base station, a scheduling message, the scheduling message received at the first base station via a backhaul communication from a second base station that neighbors the first base station; and
performing, at the UE, one or more operations based on the scheduling message, wherein the scheduling message includes one or more elements for one or more upcoming slots scheduled for use by the second base station, the one or more elements indicating one or more beams of the second base station that are scheduled for use in upcoming transmissions to one or more second UEs served by the second base station and including transmission configuration indication (TCI) states used by the second base station.

18. The method of claim 17, wherein receiving the scheduling message comprises receiving one or more synchronization signal block (SSB) beams that include the scheduling message.

19. The method of claim 18, wherein receiving the scheduling message comprises receiving a group common-physical downlink control channel (GC-PDCCH) that includes the scheduling message.

20. The method of claim 18, wherein the one or more elements are defined at a radio resource control (RRC) level for multiple neighboring cells corresponding to multiple physical cell identities (PCIs).

21. The method of claim 17, wherein receiving the scheduling message comprises receiving a unicast message from the first base station, a scheduling downlink control information (DCI) message from the first base station, or both.

22. The method of claim 17, wherein the one or more operations include:
identifying at least one beam of the one or more beams corresponding to a high level of interference at the UE; and
enabling a different antenna panel during a slot corresponding to the at least one beam.

23. The method of claim 17, wherein the one or more operations include:
identifying at least one beam of the one or more beams corresponding to a high level of interference at the UE; and
enabling interference detection and cancellation operations during a slot corresponding to the at least one beam.

24. The method of claim 17, wherein the one or more operations include:
identifying at least one beam of the one or more beams corresponding to a high level of interference at the UE; and
performing channel estimation based on previous interference corresponding to the at least one beam during a slot corresponding to the at least one beam.

25. An apparatus configured for wireless communication, the apparatus comprising:
at least one processor; and
a memory coupled to the at least one processor,
wherein the at least one processor is configured to:
receive, from a first base station at a user equipment (UE) served by the first base station, a scheduling message, the scheduling message received at the first base station via a backhaul communication from a second base station that neighbors the first base station; and
perform, at the UE, one or more operations based on the scheduling message, wherein the scheduling message includes one or more elements for one or more upcoming slots scheduled for use by the second base station, the one or more elements indicating one or more beams of the second base station that are scheduled for use in upcoming transmissions to one or more second UEs served by the second base station and including transmission configuration indication (TCI) states used by the second base station.

26. The apparatus of claim 25, wherein the one or more beams are indicated by the TCI states corresponding to the one or more beams.

27. The apparatus of claim 25, wherein the scheduling message corresponds to multiple slots, and wherein the multiple slots are upcoming compared to a current slot at the UE.

28. The apparatus of claim 25, wherein the scheduling message includes a blank transmission configuration indication (TCI) state corresponding to an unscheduled slot.

29. The apparatus of claim 25, wherein receiving the scheduling message comprises receiving a unicast message from the first base station, a scheduling downlink control information (DCI) message from the first base station, or both.

\* \* \* \* \*